(12) United States Patent
Zhou et al.

(10) Patent No.: US 11,038,662 B2
(45) Date of Patent: Jun. 15, 2021

(54) INTERRUPTION FOR SCELL ACTIVATION AND DEACTIVATION WITH SHORT TRANSMISSION TIME INTERVAL

(71) Applicant: INTEL CORPORATION, Santa Clara, CA (US)

(72) Inventors: Yuhan Zhou, Santa Clara, CA (US); Jie Cui, Santa Clara, CA (US); Yang Tang, Santa Clara, CA (US); Hong He, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/409,371

(22) Filed: May 10, 2019

(65) Prior Publication Data

US 2019/0268128 A1 Aug. 29, 2019

Related U.S. Application Data

(60) Provisional application No. 62/671,287, filed on May 14, 2018.

(51) Int. Cl.
*H04L 5/00* (2006.01)
*H04W 72/04* (2009.01)
(Continued)

(52) U.S. Cl.
CPC .......... *H04L 5/0098* (2013.01); *H04L 1/1819* (2013.01); *H04L 5/0082* (2013.01);
(Continued)

(58) Field of Classification Search
CPC ... H04L 5/0098; H04L 1/1819; H04L 5/1469; H04W 72/0446; H04W 8/08
See application file for complete search history.

(56) References Cited

U.S. PATENT DOCUMENTS 9,674,835 B2 * 6/2017 Kim ..................... H04L 5/001
10,159,076 B2 * 12/2018 Lee ................... H04W 72/0453
(Continued)

OTHER PUBLICATIONS

3GPP TS 36.133, "3rd Generation Partnership Project; Technical Specification Group Radio Access Network; Evolved Universal Terrestrial Radio Access (E-UTRA); Requirements for support of radio resource management (Release 15)", V15.2.0, Mar. 2018, 3027 pages.

*Primary Examiner* — Mohammad S Anwar
(74) *Attorney, Agent, or Firm* — Alliance IP, LLC

(57) ABSTRACT

Systems and methods provide solutions for PCell interruption for SCell activation and deactivation. A user equipment (UE) may select the delay of PCell interruption based on the transmission time interval (TTI) and the processing time (e.g., the hybrid automatic repeat request (HARD) processing time). A UE may be configured to process a physical downlink shared channel (PDSCH) comprising an activation command or a deactivation command in a first subframe for an SCell. In response to the activation or deactivation command, based on a TTI length corresponding to the PDSCH, the UE determines the delay for PCell interruption. The delay corresponds to a selected second subframe after the first subframe, wherein a first delay for a first TTI length is longer than a second delay for a second TTI length, and wherein the second TTI length is a shortened TTI (sTTI) compared to the first TTI length.

10 Claims, 13 Drawing Sheets

(51) Int. Cl.
*H04W 8/08* (2009.01)
*H04L 1/18* (2006.01)
*H04L 5/14* (2006.01)

(52) U.S. Cl.
CPC ............ *H04L 5/1469* (2013.01); *H04W 8/08* (2013.01); *H04W 72/0446* (2013.01)

(56) References Cited

U.S. PATENT DOCUMENTS

| | | | |
|---|---|---|---|
| 2015/0327054 A1* | 11/2015 | Callender | H04W 24/10 370/329 |
| 2015/0381400 A1* | 12/2015 | Park | H04L 5/001 370/329 |
| 2019/0305918 A1* | 10/2019 | Siomina | H04W 76/36 |

\* cited by examiner

— 1 —

INTERRUPTION FOR SCELL ACTIVATION AND DEACTIVATION WITH SHORT TRANSMISSION TIME INTERVAL

CROSS-REFERENCE TO RELATED APPLICATIONS

This application claims the benefit under 35 U.S.C. § 119(e) of U.S. Provisional Application No. 62/671,287, filed May 14, 2018, which is hereby incorporated by reference herein in its entirety.

TECHNICAL FIELD

This application relates generally to wireless communication systems, and more specifically to interruption for secondary cell (SCell) activation and deactivation with shortened transmission time interval (sTTI).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Certain embodiments herein are directed to SCell activation and deactivation delay for evolved universal terrestrial radio access (E-UTRA) carrier aggregation. A UE may be able to activate a deactivated or dormant SCell, deactivate an activated or dormant SCell, or hibernate a deactivated or activated SCell in E-UTRA carrier aggregation. The embodiments may be applicable, for example, for E-UTRA frequency-division duplexing (FDD), E-UTRA time-division duplexing (TDD), and E-UTRA TDD-FDD carrier aggregation.

When an SCell is configured or activated to the UE or the SCell is released or deactivated, the UE may reconfigure the radio frequency (RF) frontend. This may include the procedure of reconfiguring the RF filter bandwidth in adaptation to the situation in which the SCell is newly configured or activated, released, or deactivated. The data communication is suspended while the UE is reconfiguring the bandwidth. For discussion herein, it is assumed that a previously configured serving cell is the primary cell (PCell). The suspension of the data communication is referred to as PCell interruption.

Certain embodiments herein select the delay of PCell interruption based on the transmission time interval (TTI) and the processing time (e.g., the hybrid automatic repeat request (HARQ) processing time). TTI is a parameter related to encapsulation of data from higher layers into frames for transmission on the radio link layer. TTI refers to the duration of a transmission on the radio link. To reduce latency, certain wireless networks or cells within a wireless network may use a shortened transmission time interval (sTTI). For example, whereas an LTE network uses a 1 millisecond (ms) TTI corresponding to a subframe comprising two 0.5 ms slots that each include seven orthogonal frequency-division multiplexing symbols (OS) (e.g., for normal cyclic prefix), newer systems may include cells configured for 7OS (1-slot) TTI and/or 2OS TTI. Persons skilled in the art will recognize from the disclosure herein that other TTI lengths may also be used, including those based on other subframe, slot, and OS configurations.

Figure 1:
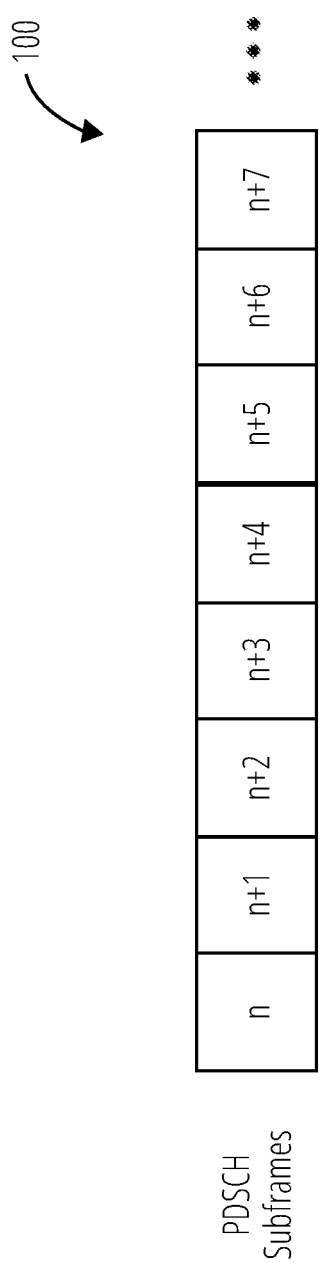
FIG. 1 illustrates a diagram showing subframes in accordance with certain embodiments.

FIG. 1 illustrates a diagram showing subframes 100 of a physical downlink shared channel (PDSCH) according to certain embodiments herein. In this example, the UE receives an SCell activation command or an SCell deactivation command in subframe n. In response to the SCell activation command or the SCell deactivation command, the UE delays PCell interruption based on a combination of the TTI and the processing time. For example, in one embodiment the PCell interruption due to SCell activation and deactivation may not occur before: subframe n+5 if the deactivation command is transmitted on the PDSCH with 1 ms TTI and 4 subframe HARQ processing time; subframe n+4 if the deactivation command is transmitted on the PDSCH with 1 ms TTI and 3 subframe HARQ processing time; subframe n+3 if the deactivation command is transmitted on the PDSCH with 1 slot TTI; or subframe n+2 if the deactivation command is transmitted on the PDSCH with subslot TTI.

A system may define a maximum timing advance (TA) and processing time for LTE shortened processing time and TTI. Example minimum processing time and maximum supported timing advance combinations are shown in Table 1.

TABLE 1

| Reduced processing time and short TTI configuration | Min. Processing time | $TA_{max}$ |
| --- | --- | --- |
| 1 ms TTI with reduced processing time | N + 3 | 6144 * Ts |
| slot TTI | N + 4 | 9520 * Ts |
| Subslot TTI Set 1 | N + 4 | 2048 * Ts for N + 4 |
| | N + 6 | 10816 * Ts for N + 6 |
| Subslot TTI Set 2 | N + 6 | 5120 * Ts for N + 6 |
| | N + 8 | 13888 * Ts for N + 8 |

For subslot TTI, two different sets (Set 1 & Set 2, see Table 1 above) of minimum processing time and maximum TA may be used. In certain embodiments, a UE may have capability to indicate the support of either Set 1 or Set 2 for subslot TTI, depending on the serving physical downlink control channel (sPDCCH) resource block (RB) set configuration (separate Set indication for 1OS Cell-Specific Reference Signals (CRS)-based sPDCCH, 2OS CRS-based sPDCCH and Demodulation reference signal (DMRS)-based sPDCCH) as well as potentially depending on the reference signal type of subslot PDSCH (i.e., DMRS-based subslot PDSCH/CRS-based subslot PDSCH). In addition, or in other embodiments, the minimum processing time assumption for subslot TTI operation (i.e., N+4, N+6 or N+8) is configured by radio resource control (RRC).

Accordingly, the location of the interruption for SCell activation and deactivation should also be changed. Specifically, embodiments of the present disclosure modify the following sentences in the current 3GPP technical specification (TS) 36.133 for the location of interruption for SCell activation/deactivation: the PCell interruption specified in section 7.8.2 may not occur before subframe n+5 and not occur after subframe n+9 when PCell belongs to E-UTRA FDD; and the PCell interruption specified in section 7.8.2 may not occur before subframe n+5 and not occur after subframe n+11 when PCell belongs to E-UTRA TDD.

For example, certain embodiments herein modify the above sentences as follows. When PCell belongs to E-UTRA FDD, the PCell interruption specified in section 7.8.2 shall: not occur before subframe n+5 and not occur after subframe n+9 if the activation or deactivation command is transmitted on the PDSCH with ShortTTI not configured and ShortProcessingTime=FALSE; not occur before subframe n+4 if the activation or deactivation command is transmitted on the PDSCH with ShortTTI not configured and ShortProcessingTime=TRUE; not occur before subframe n+3 if the activation or deactivation command is transmitted on the PDSCH with dl-STTI-Length=slot; and not occur before subframe n+2 if the activation or deactivation command is transmitted on the PDSCH with dl-STTI-Length=subslot and proc-Timeline=nplus4set1, proc-Timeline=nplus6set1 or proc-Timeline=nplus6set2. Further, when PCell belongs to E-UTRA TDD, the PCell interruption specified in section 7.8.2 shall: not occur before subframe n+5 if the activation or deactivation command is transmitted on the PDSCH with ShortTTI not configured and ShortProcessingTime=FALSE; not occur before subframe n+4 if the activation or deactivation command is transmitted on the PDSCH with ShortTTI not configured and ShortProcessingTime=TRUE; and not occur before subframe n+3 if the activation or deactivation command is transmitted on the PDSCH with dl-STTI-Length=slot. By way of example, the TTI may be 1 ms when the ShortTTI parameter is not configured and the TTI may be based on the slot or subslot when the ShortTTI parameter is configured. The dl-STTI-Length parameter indicates whether a slot TTI or a subslot TTI is used. Also by way of example, the processing time may be a 4 subframe HARQ processing time when the ShortProcessingTime parameter is FALSE, and the processing time may be a 3 subframe HARQ processing time when the ShortProcessingTime parameter is TRUE. The proc-Timeline parameter specifies the minimum processing time corresponding to subslot TTI Set 1 or subslot TTI Set 2 shown in Tables 1 and 2.

Based on the current expression, it is reasonable to specify the interruption location in the unit of subframes for slot/subslot TTI. Table 2 provides the number of UE processing time in unit of subframe.

TABLE 2

| Reduced processing time and short TTI configuration | Min. Processing time | In the unit of Subframe |
| --- | --- | --- |
| 1 ms TTI with reduced processing time | N + 3 | N + 3 |
| slot TTI | N + 4 | N + 2 |
| Subslot TTI Set 1 | N + 4 | N + 1 |
| | N + 6 | N + 1 |
| Subslot TTI Set 2 | N + 6 | N + 1 |
| | N + 8 | N + 2 |

Figure 2:
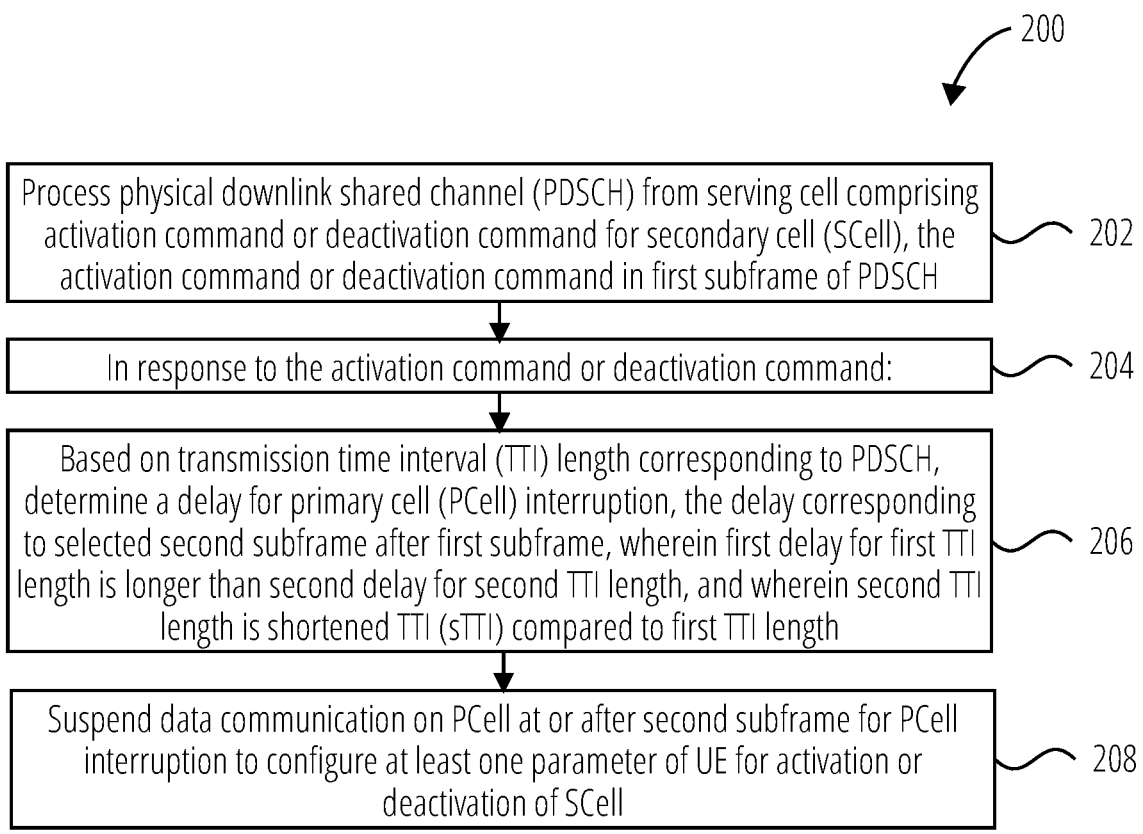
FIG. 2 illustrates a method in accordance with one embodiment.
Figure 3:
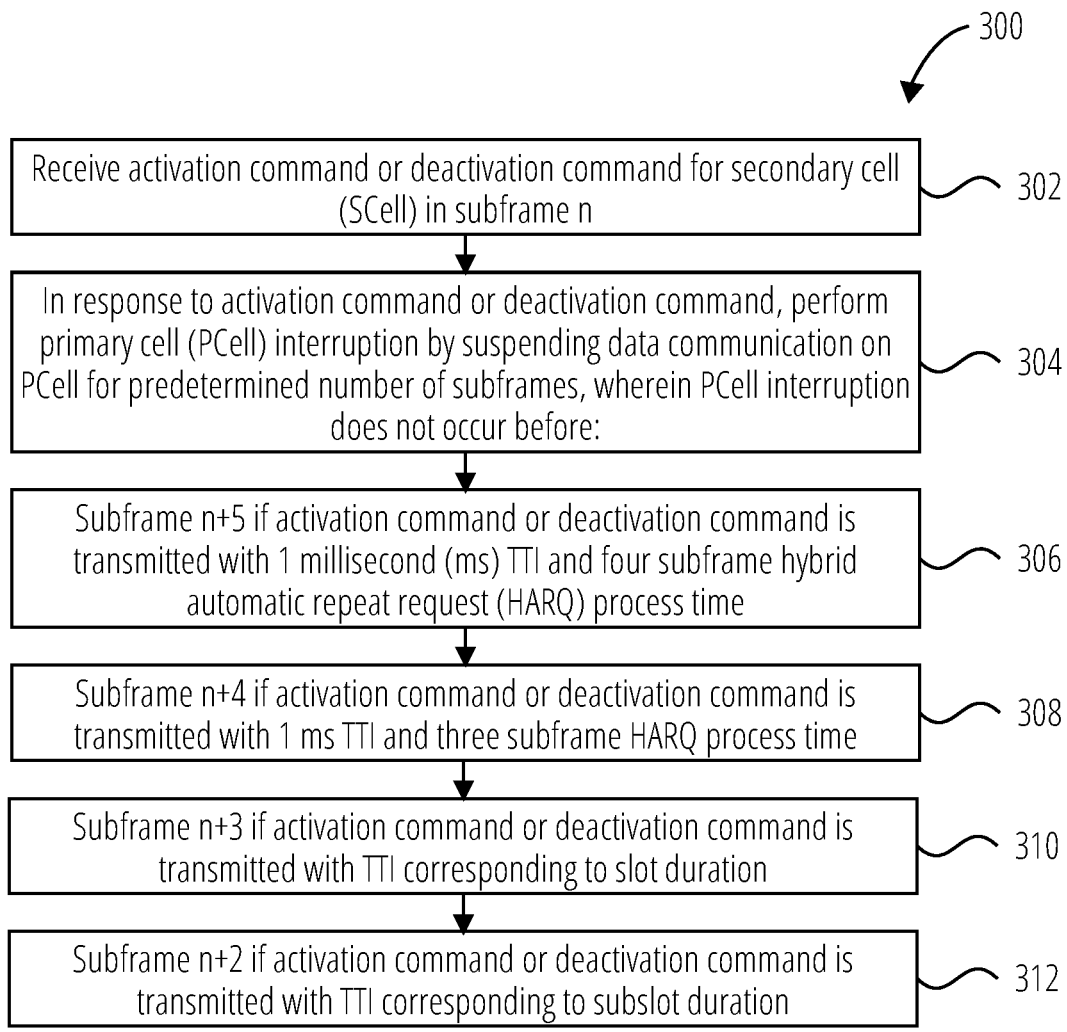
FIG. 3 illustrates a method in accordance with one embodiment.
Figure 4:
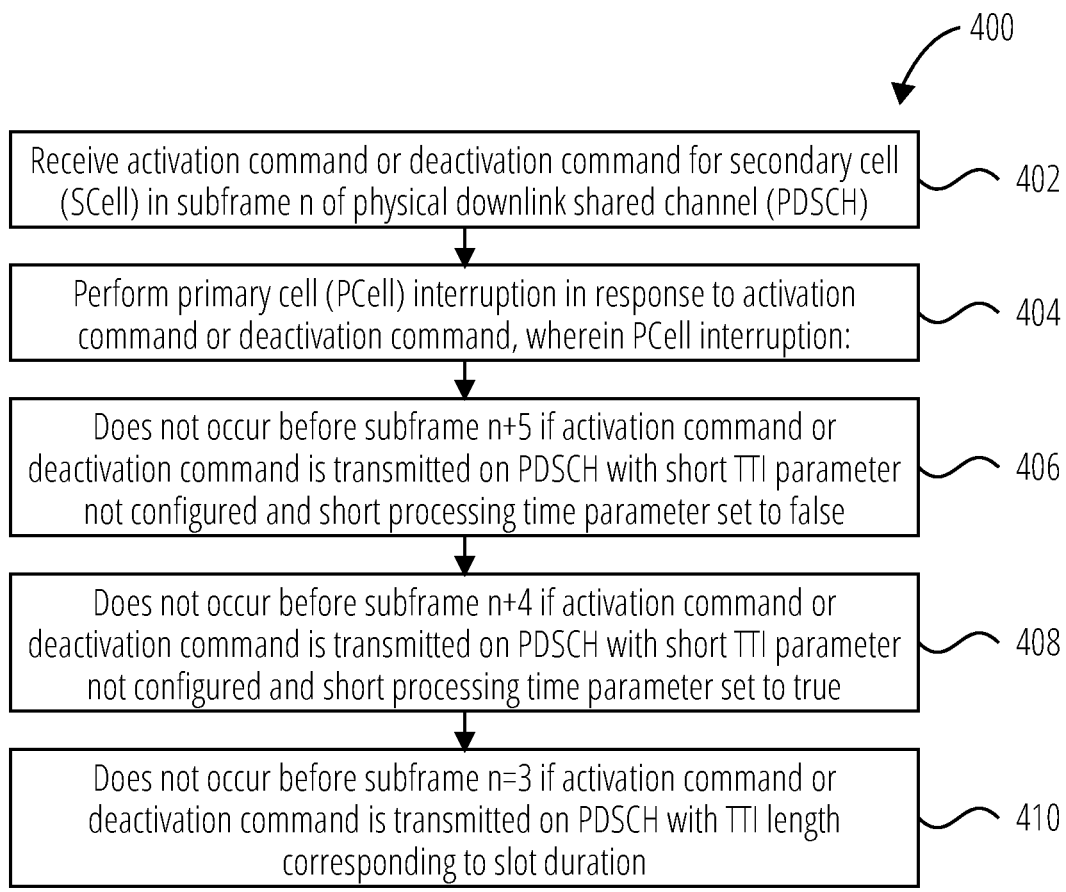
FIG. 4 illustrates a method in accordance with one embodiment.
Figure 5:
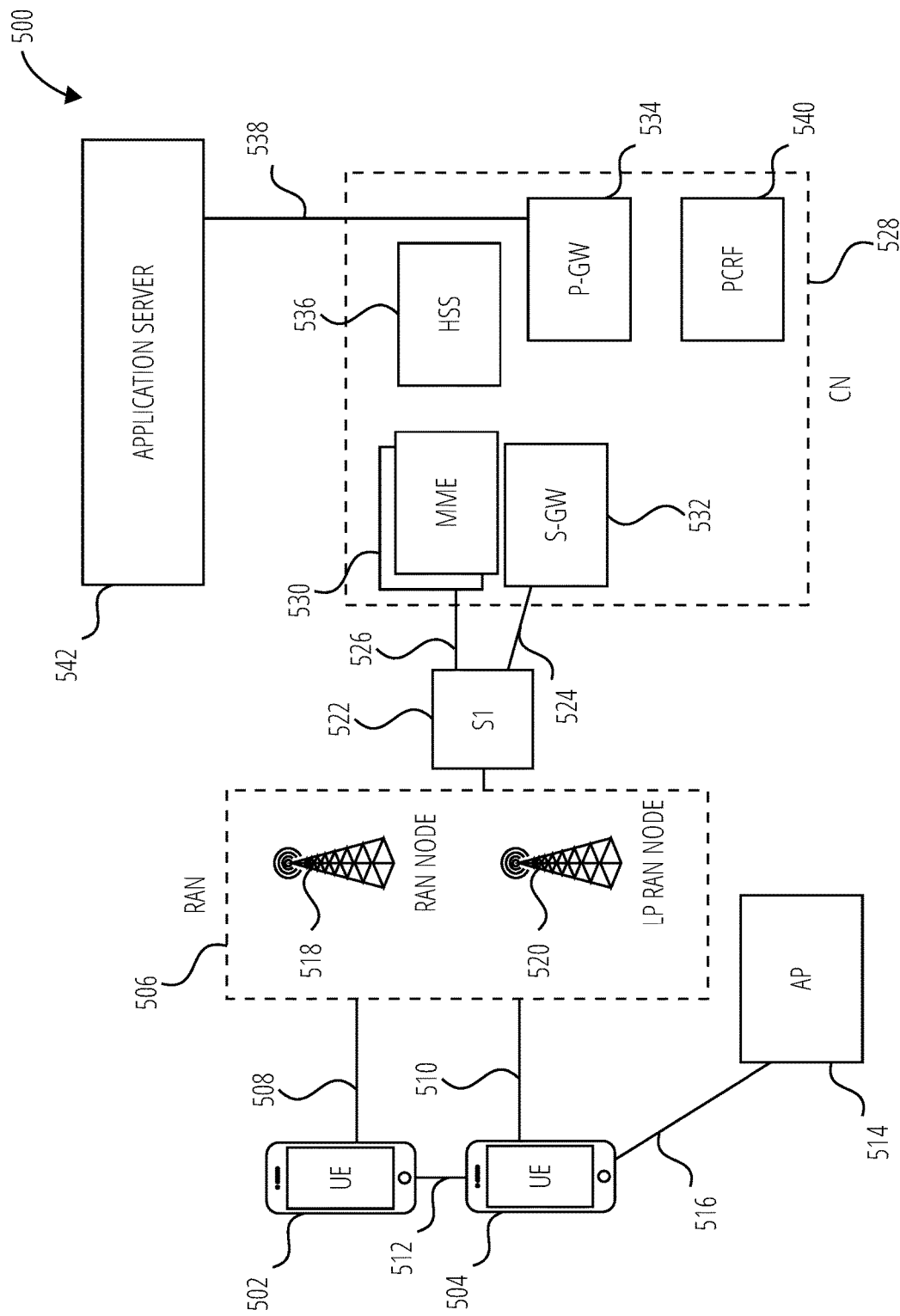
FIG. 5 illustrates a system in accordance with one embodiment.
Figure 6:
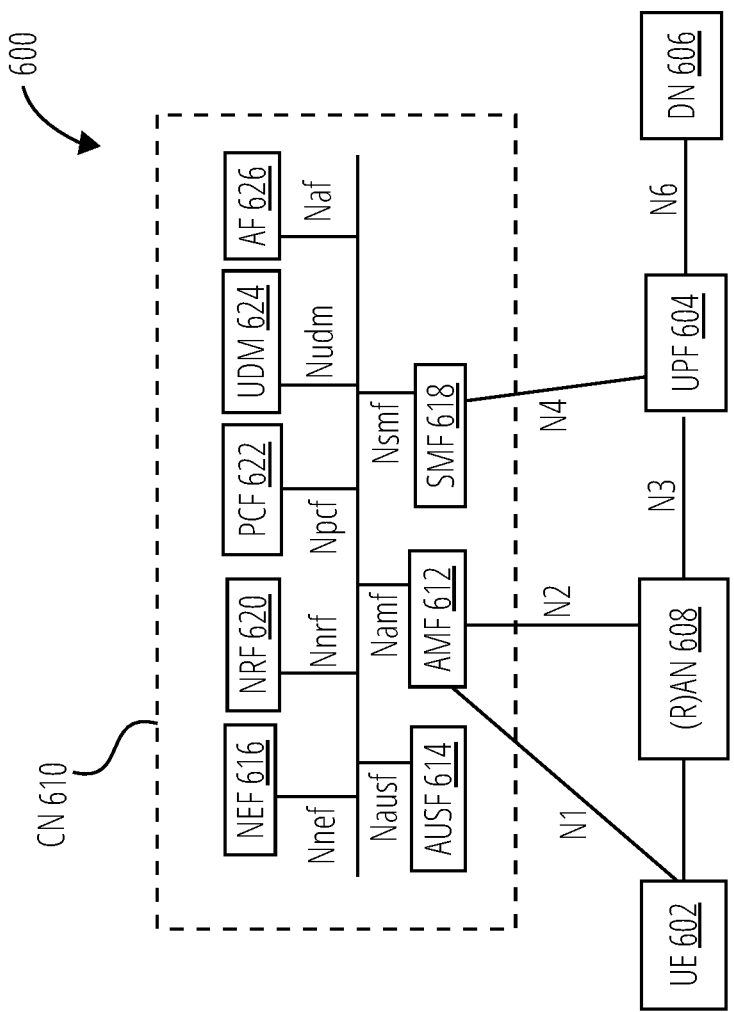
FIG. 6 illustrates a system in accordance with one embodiment.

The example methods shown in FIG. 2, FIG. 3, and/or FIG. 4 may be performed, for example, by UE 502 or UE 504 shown in FIG. 5 or UE 602 shown in FIG. 6.

FIG. 2 illustrates a method for a UE according to one embodiment. In block 202, method 200 processes a physical downlink shared channel (PDSCH) from a serving cell comprising an activation command or a deactivation command for a secondary cell (SCell). The activation command or the deactivation command is in a first subframe of the PDSCH. In block 204, in response to the activation command or the deactivation command, method 200 performs block 206 and block 208. In block 206, based on a transmission time interval (TTI) length corresponding to the PDSCH, the method 200 determines a delay for primary cell (PCell) interruption. The delay corresponds to a selected second subframe after the first subframe, wherein a first delay for a first TTI length is longer than a second delay for a second TTI length, and wherein the second TTI length is a shortened TTI (sTTI) compared to the first TTI length. In block 208, method 200 suspends data communication on the PCell at or after the second subframe for the PCell interruption to configure at least one parameter of the UE for activation or deactivation of the SCell. In certain embodiments, a shorter HARQ processing time further reduces the delay.

FIG. 3 illustrates a method for a UE according to one embodiment. In block 302, method 300 receives an activation command or a deactivation command for a secondary cell (SCell) in a subframe n. In block 304, in response to the activation command or the deactivation command, method 300 performs primary cell (PCell) interruption by suspending data communication on the PCell for a predetermined number of subframes, wherein the PCell interruption does not occur before a subframe as indicated in block 306, block 308, block 310, or block 312. In block 306, method 300 does not allow PCell interruption before subframe n+5 if the activation command or the deactivation command is transmitted with a 1 millisecond (ms) TTI and a four subframe hybrid automatic repeat request (HARQ) processes time. In block 308, method 300 does not allow PCell interruption before subframe n+4 if the activation command or the deactivation command is transmitted with a 1 ms TTI and a three subframe HARQ processes time. In block 310, method 300 does not allow PCell interruption before subframe n+3 if the activation command or the deactivation command is transmitted with a TTI corresponding to a slot duration. In block 312, method 300 does not allow PCell interruption before subframe n+2 if the activation command or the deactivation command is transmitted with a TTI corresponding to a subslot duration.

FIG. 4 illustrates a method for a UE according to one embodiment. In block 402, method 400 receives an activation command or a deactivation command for a secondary cell (SCell) in a subframe n of a physical downlink shared channel (PDSCH). In block 404, method 400 performs primary cell (PCell) interruption in response to the activation command or the deactivation command, wherein the PCell interruption does not occur before a subframe as indicated in block 406, block 408, or block 410. In block 406, PCell interruption does not occur before subframe n+5 if the activation command or the deactivation command is transmitted on the PDSCH with a short TTI parameter not configured and a short processing time parameter set to false. In block 408, PCell interruption does not occur before subframe n+4 if the activation command or the deactivation command is transmitted on the PDSCH with the short TTI parameter not configured and the short processing time parameter set to true. In block 410, PCell interruption does not occur before subframe n=3 if the activation command or the deactivation command is transmitted on the PDSCH with TTI length corresponding to a slot duration.

FIG. 5 illustrates an architecture of a system 500 of a network in accordance with some embodiments. The system 500 includes one or more user equipment (UE), shown in this example as a UE 502 and a UE 504. The UE 502 and the UE 504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 502 and the UE 504 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and the UE 504 may be configured to connect, e.g., communicatively couple, with a radio access network (RAN), shown as RAN 506. The RAN 506 may be, for example, an Evolved Universal Mobile Telecommunications System (UMTS) Terrestrial Radio Access Network (E-UTRAN), a NextGen RAN (NG RAN), or some other type of RAN. The UE 502 and the UE 504 utilize connection 508 and connection 510, respectively, each of which comprises a physical communications interface or layer (discussed in further detail below); in this example, the connection 508 and the connection 510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 502 and the UE 504 may further directly exchange communication data via a ProSe interface 512. The ProSe interface 512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 504 is shown to be configured to access an access point (AP), shown as AP 514, via connection 516. The connection 516 can comprise a local wireless connection, such as a connection consistent with any IEEE 802.11 protocol, wherein the AP 514 would comprise a wireless fidelity (WiFi®) router. In this example, the AP 514 may be connected to the Internet without connecting to the core network of the wireless system (described in further detail below).

The RAN 506 can include one or more access nodes that enable the connection 508 and the connection 510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 506 may include one or more RAN nodes for providing macrocells, e.g., macro RAN node 518, and one or more RAN nodes for providing femtocells or picocells (e.g., cells having smaller coverage areas, smaller user capacity, or higher bandwidth compared to macrocells), e.g., a low power (LP) RAN node such as LP RAN node 520.

Any of the macro RAN node 518 and the LP RAN node 520 can terminate the air interface protocol and can be the first point of contact for the UE 502 and the UE 504. In some embodiments, any of the macro RAN node 518 and the LP RAN node 520 can fulfill various logical functions for the RAN 506 including, but not limited to, radio network controller (RNC) functions such as radio bearer management, uplink and downlink dynamic radio resource management and data packet scheduling, and mobility management.

In accordance with some embodiments, the UE 502 and the UE 504 can be configured to communicate using Orthogonal Frequency-Division Multiplexing (OFDM) communication signals with each other or with any of the macro RAN node 518 and the LP RAN node 520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 518 and the LP RAN node 520 to the UE 502 and the UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 502 and the UE 504. The physical downlink control channel (PDCCH) may carry information about the transport format and resource allocations related to the PDSCH channel, among other things. It may also inform the UE 502 and the UE 504 about the transport format, resource allocation, and H-ARQ (Hybrid Automatic Repeat Request) information related to the uplink shared channel. Typically, downlink scheduling (assigning control and shared channel resource blocks to the UE 504 within a cell) may be performed at any of the macro RAN node 518 and the LP RAN node 520 based on channel quality information fed back from any of the UE 502 and UE 504. The downlink resource assignment information may be sent on the PDCCH used for (e.g., assigned to) each of the UE 502 and the UE 504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 506 is communicatively coupled to a core network (CN), shown as CN 528—via an S1 interface 522. In embodiments, the CN 528 may be an evolved packet core (EPC) network, a NextGen Packet Core (NPC) network, or some other type of CN. In this embodiment the S1 interface 522 is split into two parts: the S1-U interface 524, which carries traffic data between the macro RAN node 518 and the LP RAN node 520 and a serving gateway (S-GW), shown as S-GW 532, and an S1-mobility management entity (MME) interface, shown as S1-MME interface 526, which is a signaling interface between the macro RAN node 518 and LP RAN node 520 and the MME(s) 530.

In this embodiment, the CN 528 comprises the MME(s) 530, the S-GW 532, a Packet Data Network (PDN) Gateway (P-GW) (shown as P-GW 534), and a home subscriber server (HSS) (shown as HSS 536). The MME(s) 530 may be similar in function to the control plane of legacy Serving General Packet Radio Service (GPRS) Support Nodes (SGSN). The MME(s) 530 may manage mobility aspects in access such as gateway selection and tracking area list management. The HSS 536 may comprise a database for network users, including subscription-related information to support the network entities' handling of communication sessions. The CN 528 may comprise one or several HSS 536, depending on the number of mobile subscribers, on the capacity of the equipment, on the organization of the network, etc. For example, the HSS 536 can provide support for routing/roaming, authentication, authorization, naming/addressing resolution, location dependencies, etc.

The S-GW 532 may terminate the S1 interface 322 towards the RAN 506, and routes data packets between the RAN 506 and the CN 528. In addition, the S-GW 532 may be a local mobility anchor point for inter-RAN node handovers and also may provide an anchor for inter-3GPP mobility. Other responsibilities may include lawful intercept, charging, and some policy enforcement.

The P-GW 534 may terminate an SGi interface toward a PDN. The P-GW 534 may route data packets between the CN 528 (e.g., an EPC network) and external networks such as a network including the application server 542 (alternatively referred to as application function (AF)) via an Internet Protocol (IP) interface (shown as IP communications interface 538). Generally, an application server 542 may be an element offering applications that use IP bearer resources with the core network (e.g., UMTS Packet Services (PS) domain, LTE PS data services, etc.). In this embodiment, the P-GW 534 is shown to be communicatively coupled to an application server 542 via an IP communications interface 538. The application server 542 can also be configured to support one or more communication services (e.g., Voice-over-Internet Protocol (VoIP) sessions, PTT sessions, group communication sessions, social networking services, etc.) for the UE 502 and the UE 504 via the CN 528.

The P-GW 534 may further be a node for policy enforcement and charging data collection. A Policy and Charging Enforcement Function (PCRF) (shown as PCRF 540) is the policy and charging control element of the CN 528. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 540 may be communicatively coupled to the application server 542 via the P-GW 534. The application server 542 may signal the PCRF 540 to indicate a new service flow and select the appropriate Quality of Service (QoS) and charging parameters. The PCRF 540 may provision this rule into a Policy and Charging Enforcement Function (PCEF) (not shown) with the appropriate traffic flow template (TFT) and QoS class of identifier (QCI), which commences the QoS and charging as specified by the application server 542.

FIG. 6 illustrates an architecture of a system 600 of a network in accordance with some embodiments. The system 600 is shown to include a UE 602, which may be the same or similar to the UE 502 and the UE 504 discussed previously; a 5G access node or RAN node (shown as (R)AN node 608), which may be the same or similar to the macro RAN node 518 and/or the LP RAN node 520 discussed previously; a User Plane Function (shown as UPF 604); a Data Network (DN 606), which may be, for example, operator services, Internet access or 3rd party services; and a 5G Core Network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services. DN 606 may include, or be similar to the application server 542 discussed previously.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (NI) signaling, and perform NAS ciphering and integrity protection.

AMF 612 may also support NAS signaling with a UE 602 over an N3 interworking-function (IWF) interface. The N3IWF may be used to provide access to untrustedentities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control☐plane NAS (NI) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NF s.

As discussed previously, the CN 610 may include an SMSF, which may be responsible for SMS subscription checking and verification, and relaying SM messages to/from the UE 602 to/from other entities, such as an SMS☐GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service☐based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME (e.g., MME(s) 530) and the AMF 612 in order to enable interworking between CN 610 and CN 528.

Although not shown by FIG. 6, the system 600 may include multiple RAN nodes (such as (R)AN node 608) wherein an Xn interface is defined between two or more (R)AN node 608 (e.g., gNBs and the like) that connecting to 5GC 410, between a (R)AN node 608 (e.g., gNB) connecting to CN 610 and an eNB (e.g., a macro RAN node 518 of FIG. 5), and/or between two eNBs connecting to CN 610.

In some implementations, the Xn interface may include an Xn user plane (Xn☐U) interface and an Xn control plane (Xn-C) interface. The Xn-U may provide non☐guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
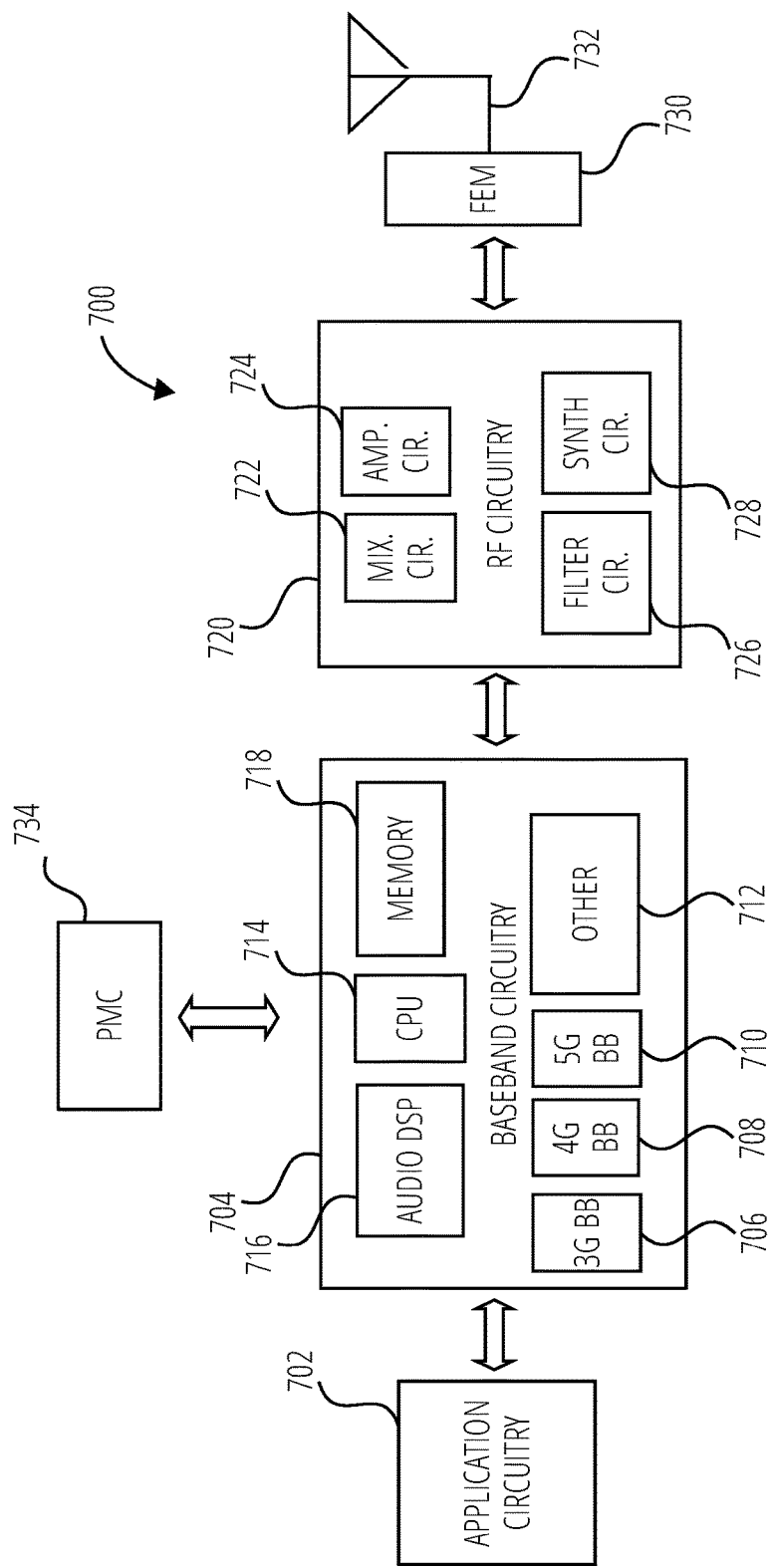
FIG. 7 illustrates a device in accordance with one embodiment.

FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission.

In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
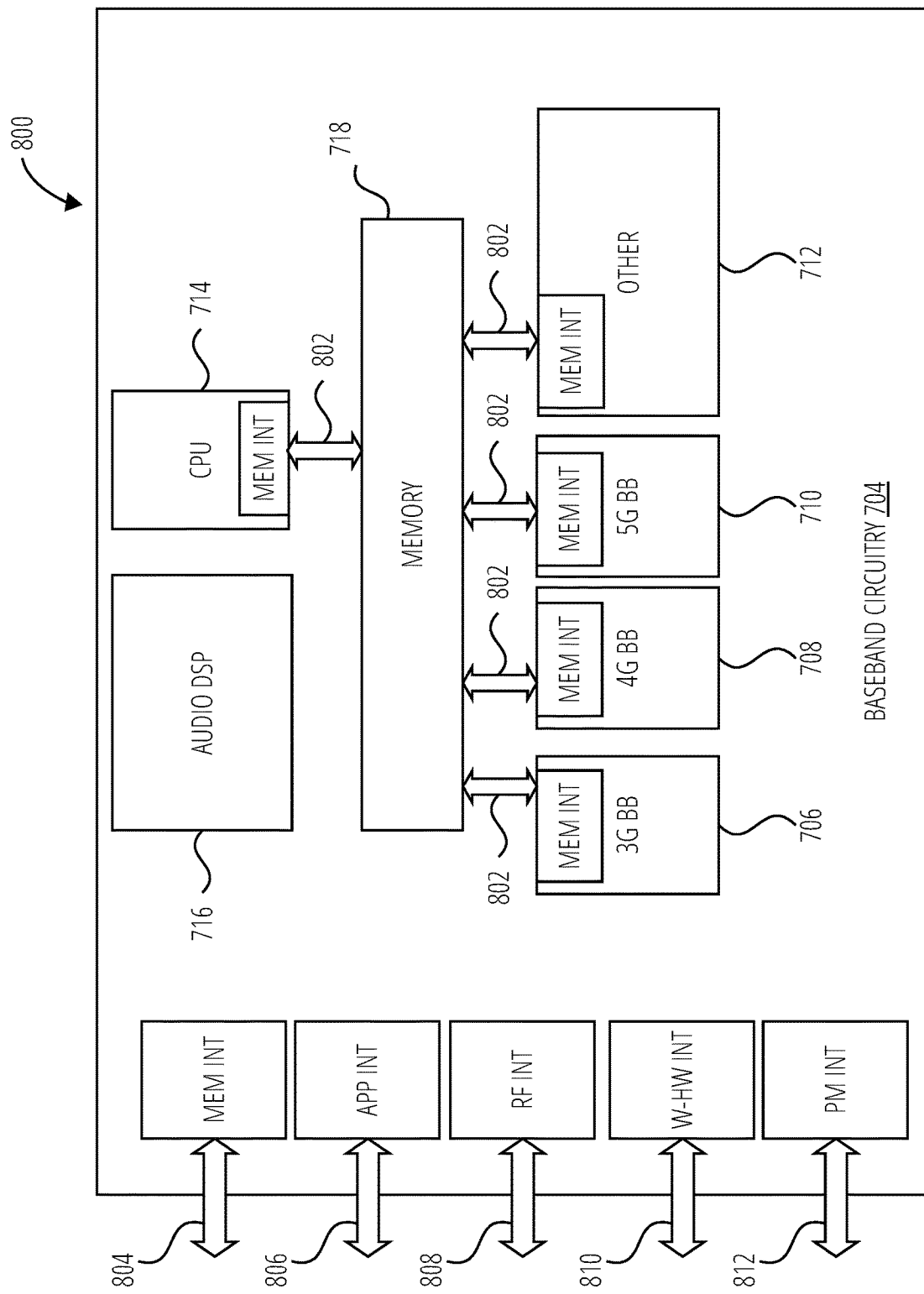
FIG. 8 illustrates an example interfaces in accordance with one embodiment.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
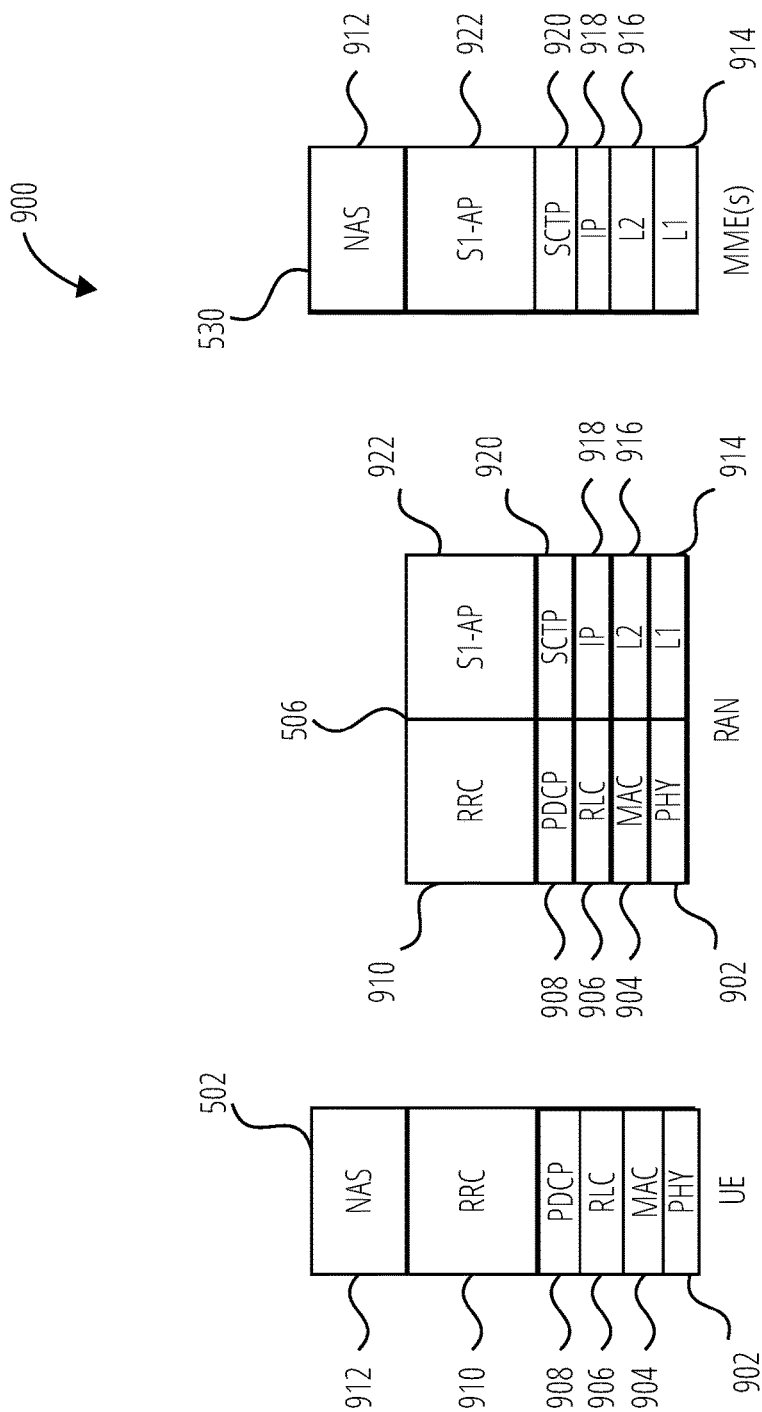
FIG. 9 illustrates a control plane in accordance with one embodiment.

FIG. 9 is an illustration of a control plane protocol stack in accordance with some embodiments. In this embodiment, a control plane 900 is shown as a communications protocol stack between the UE 502 (or alternatively, the UE 504), the RAN 506 (e.g., the macro RAN node 518 and/or the LP RAN node 520), and the MME(s) 530.

A PHY layer 902 may transmit or receive information used by the MAC layer 904 over one or more air interfaces. The PHY layer 902 may further perform link adaptation or adaptive modulation and coding (AMC), power control, cell search (e.g., for initial synchronization and handover purposes), and other measurements used by higher layers, such as an RRC layer 910. The PHY layer 902 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 904 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 906 may operate in a plurality of modes of operation, including: Transparent Mode (TM), Unacknowledged Mode (UM), and Acknowledged Mode (AM). The RLC layer 906 may execute transfer of upper layer protocol data units (PDUs), error correction through automatic repeat request (ARQ) for AM data transfers, and concatenation, segmentation and reassembly of RLC SDUs for UM and AM data transfers. The RLC layer 906 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 908 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 910 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 502 and the RAN 506 may utilize a Uu interface (e.g., an LTE-Uu interface) to exchange control plane data via a protocol stack comprising the PHY layer 902, the MAC layer 904, the RLC layer 906, the PDCP layer 908, and the RRC layer 910.

In the embodiment shown, the non-access stratum (NAS) protocols (NAS protocols 912) form the highest stratum of the control plane between the UE 502 and the MME(s) 530. The NAS protocols 912 support the mobility of the UE 502 and the session management procedures to establish and maintain IP connectivity between the UE 502 and the P-GW 534.

The S1 Application Protocol (S1-AP) layer (S1-AP layer 922) may support the functions of the S1 interface and comprise Elementary Procedures (EPs). An EP is a unit of interaction between the RAN 506 and the CN 528. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 920) may ensure reliable delivery of signaling messages between the RAN 506 and the MME(s) 530 based, in part, on the IP protocol, supported by an IP layer 918. An L2 layer 916 and an L1 layer 914 may refer to communication links (e.g., wired or wireless) used by the RAN node and the MME to exchange information.

The RAN 506 and the MME(s) 530 may utilize an S1-MME interface to exchange control plane data via a protocol stack comprising the L1 layer 914, the L2 layer 916, the IP layer 918, the SCTP layer 920, and the S1-AP layer 922.

Figure 10:
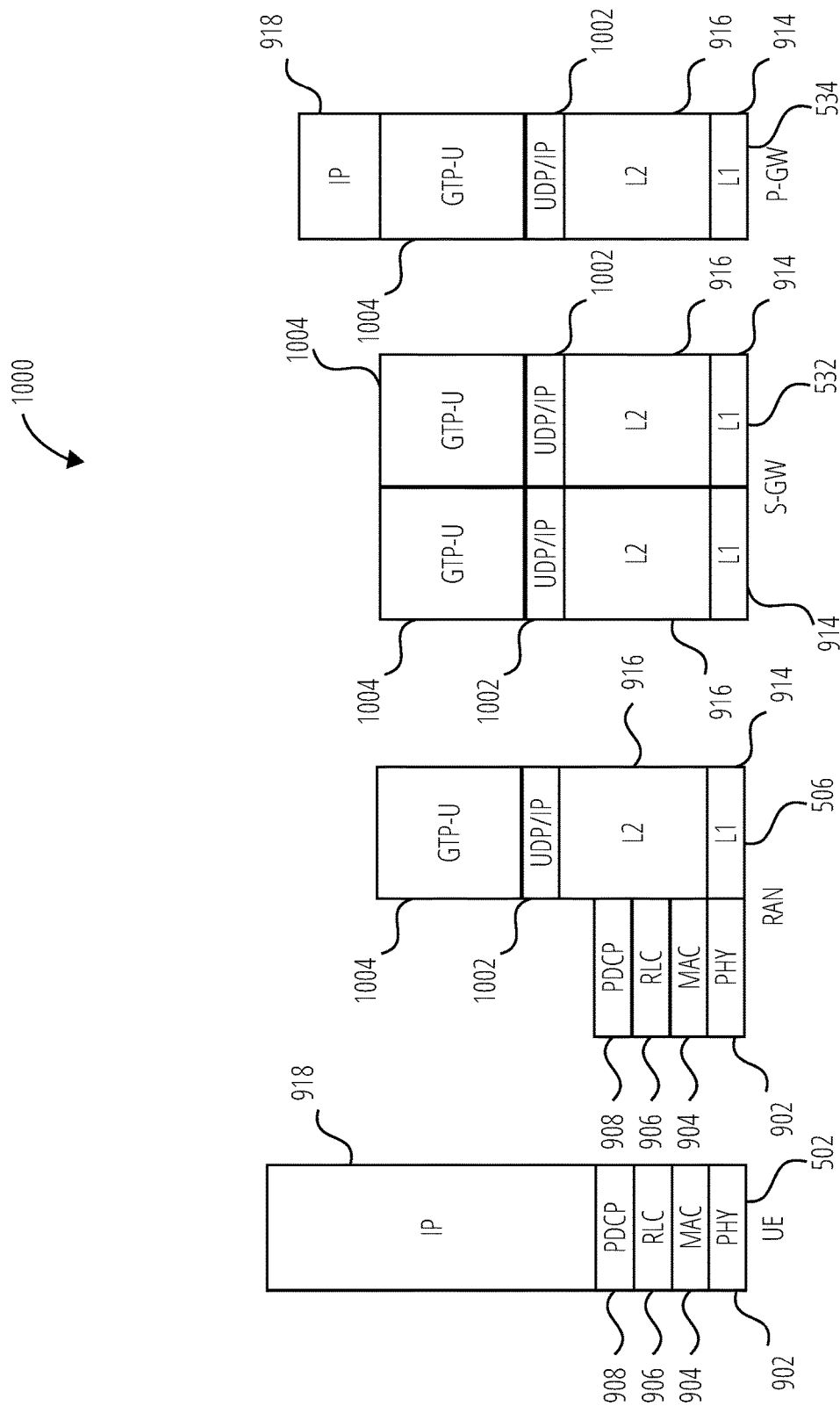
FIG. 10 illustrates a user plane in accordance with one embodiment.

FIG. 10 is an illustration of a user plane protocol stack in accordance with some embodiments. In this embodiment, a user plane 1000 is shown as a communications protocol stack between the UE 502 (or alternatively, the UE 504), the RAN 506 (e.g., the macro RAN node 518 and/or the LP RAN node 520), the S-GW 532, and the P-GW 534. The user plane 1000 may utilize at least some of the same protocol layers as the control plane 900. For example, the UE 502 and the RAN 506 may utilize a Uu interface (e.g., an LTE-Uu interface) to exchange user plane data via a protocol stack comprising the PHY layer 902, the MAC layer 904, the RLC layer 906, the PDCP layer 908.

The General Packet Radio Service (GPRS) Tunneling Protocol for the user plane (GTP-U) layer (GTP-U layer 1004) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1002) may provide checksums for data integrity, port numbers for addressing different functions at the source and destination, and encryption and authentication on the selected data flows. The RAN 506 and the S-GW 532 may utilize an S1-U interface to exchange user plane data via a protocol stack comprising the L1 layer 914, the L2 layer 916, the UDP/IP layer 1002, and the GTP-U layer 1004. The S-GW 532 and the P-GW 534 may utilize an S5/S8a interface to exchange user plane data via a protocol stack comprising the L1 layer 914, the L2 layer 916, the UDP/IP layer 1002, and the GTP-U layer 1004. As discussed above with respect to FIG. 9, NAS protocols support the mobility of the UE 502 and the session management procedures to establish and maintain IP connectivity between the UE 502 and the P-GW 534.

Figure 11:
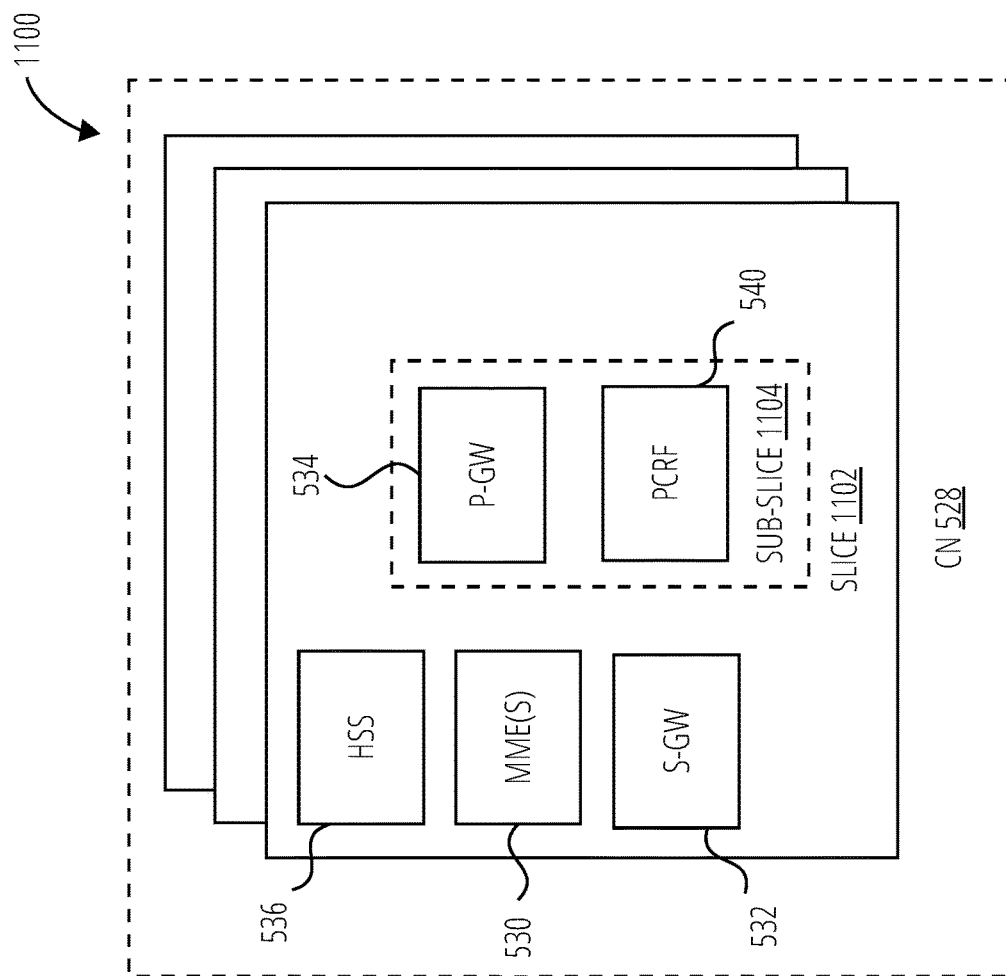
FIG. 11 illustrates components in accordance with one embodiment.

FIG. 11 illustrates components 1100 of a core network in accordance with some embodiments. The components of the CN 528 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 528 may be referred to as a network slice 1102 (e.g., the network slice 1102 is shown to include the HSS 536, the MME(s) 530, and the S-GW 532). A logical instantiation of a portion of the CN 528 may be referred to as a network sub-slice 1104 (e.g., the network sub-slice 1104 is shown to include the P-GW 534 and the PCRF 540).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
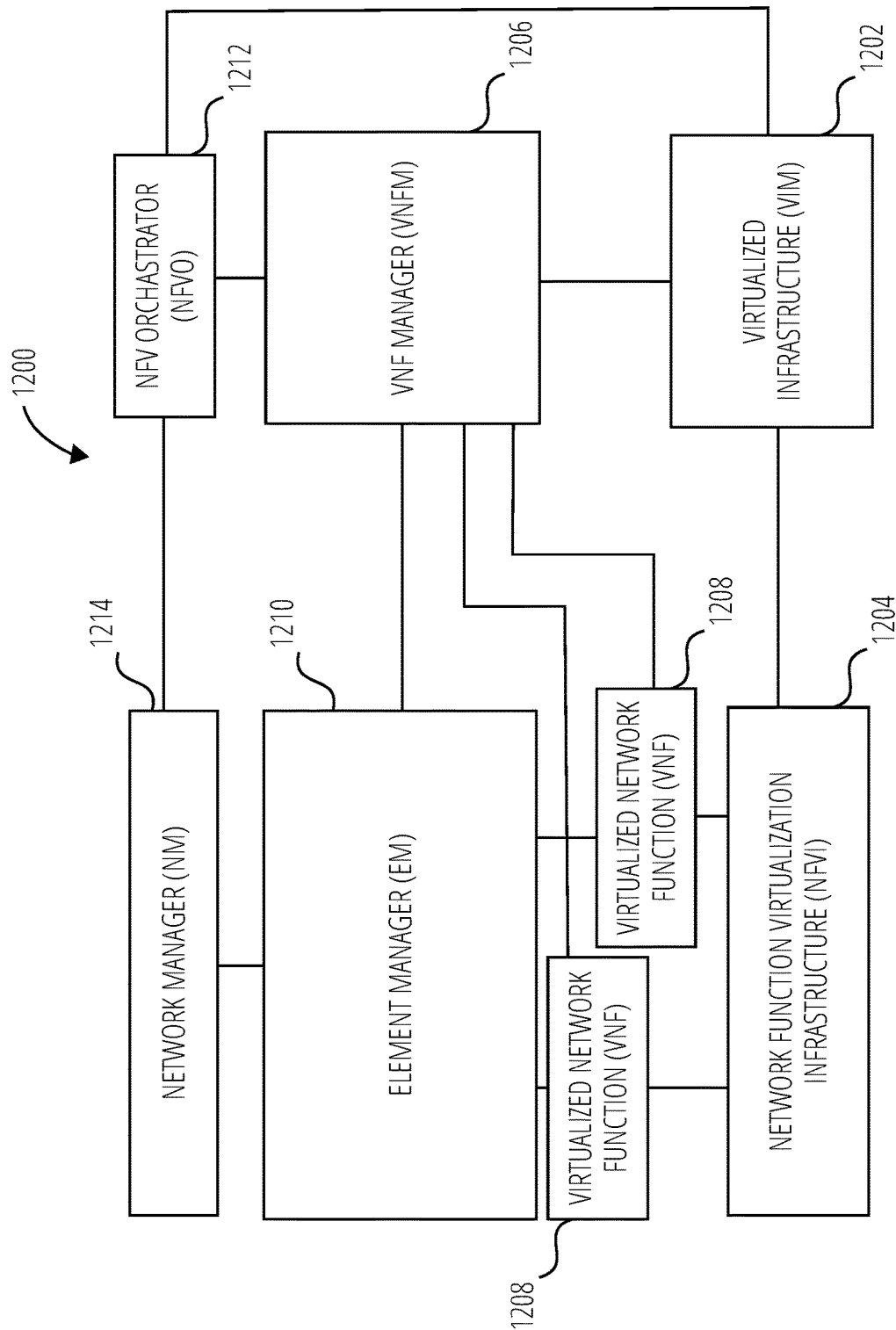
FIG. 12 illustrates a system in accordance with one embodiment.

FIG. 12 is a block diagram illustrating components, according to some example embodiments, of a system 1200 to support NFV. The system 1200 is illustrated as including a virtualized infrastructure manager (shown as VIM 1202), a network function virtualization infrastructure (shown as NFVI 1204), a VNF manager (shown as VNFM 1206), virtualized network functions (shown as VNF 1208), an element manager (shown as EM 1210), an NFV Orchestrator (shown as NFVO 1212), and a network manager (shown as NM 1214).

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1206 may manage the VNF 1208. The VNF 1208 may be used to execute EPC components/functions. The VNFM 1206 may manage the life cycle of the VNF 1208 and track performance, fault and security of the virtual aspects of VNF 1208. The EM 1210 may track the performance, fault and security of the functional aspects of VNF 1208. The tracking data from the VNFM 1206 and the EM 1210 may comprise, for example, performance measurement (PM) data used by the VIM 1202 or the NFVI 1204. Both the VNFM 1206 and the EM 1210 can scale up/down the quantity of VNFs of the system 1200.

The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
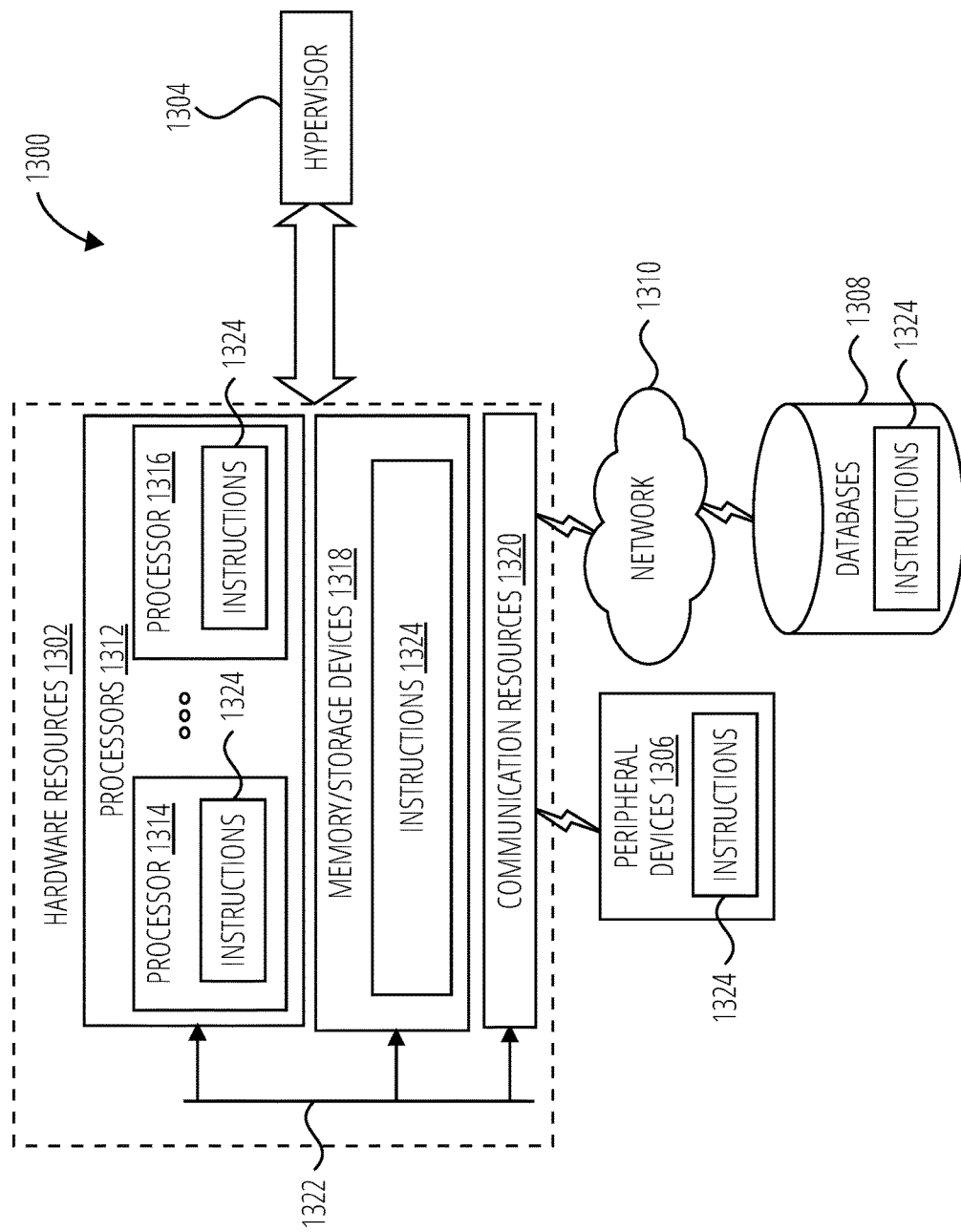
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1A is a method for a user equipment (UE). The method includes processing a physical downlink shared channel (PDSCH) from a serving cell comprising an activation command or a deactivation command for a secondary cell (SCell). The activation command or the deactivation command is in a first subframe of the PDSCH. In response to the activation command or the deactivation command, based on a transmission time interval (TTI) length corresponding to the PDSCH, the method includes determining a delay for primary cell (PCell) interruption. The delay corresponding to a selected second subframe after the first subframe, wherein a first delay for a first TTI length is longer than a second delay for a second TTI length, and wherein the second TTI length is a shortened TTI (sTTI) compared to the first TTI length. Further in response to the activation command or the deactivation command the method includes suspending data communication on the PCell at or after the second subframe for the PCell interruption to configure at least one parameter of the UE for activation or deactivation of the SCell.

Example 2A includes the method of example 1A, wherein determining the delay for the PCell interruption is further based on a hybrid automatic repeat request (HARQ) processing time, wherein a shorter HARQ processing time further reduces the delay.

Example 3A includes the method of example 2A, wherein the first subframe corresponding to the activation command or the deactivation command comprises a subframe n, and wherein determining the delay for the PCell interruption comprises determining that the PCell interruption does not occur before a subframe n+5 if the activation command or the deactivation command is transmitted on the PDSCH with a 1 millisecond (ms) TTI and a four subframe HARQ processing time.

Example 4A includes the method of example 3A, further comprising determining that the PCell interruption does not occur after a subframe n+9 when the PCell uses evolved universal terrestrial radio access (E-UTRA) frequency-division duplexing (FDD).

Example 5A includes the method of example 3A, further comprising determining that the PCell interruption does not occur after a subframe n+11 when the PCell uses evolved universal terrestrial radio access (E-UTRA) time-division duplexing (TDD).

Example 6A includes the method of example 2A, wherein the first subframe corresponding to the activation command or the deactivation command comprises a subframe n, and wherein determining the delay for the PCell interruption comprises determining that the PCell interruption does not occur before a subframe n+4 if the activation command or the deactivation command is transmitted on the PDSCH with a 1 ms TTI and a three subframe HARQ processing time.

Example 7A includes the method of example 1A, wherein the first subframe corresponding to the activation command or the deactivation command comprises a subframe n, and wherein determining the delay for the PCell interruption comprises determining that the PCell interruption does not occur before a subframe n+3 if the activation command or the deactivation command is transmitted on the PDSCH with a TTI corresponding to one slot.

Example 8A includes the method of example 1A, wherein the first subframe corresponding to the activation command or the deactivation command comprises a subframe n, and wherein determining the delay for the PCell interruption comprises determining that the PCell interruption does not occur before a subframe n+2 if the activation command or the deactivation command is transmitted on the PDSCH with a TTI corresponding to a sub slot.

Example 9A includes the method of example 1A, wherein the first subframe corresponding to the activation command or the deactivation command comprises a subframe n, wherein a short TTI parameter that is configured indicates that the activation command or the deactivation command is transmitted on the PDSCH with the sTTI, wherein a short processing time parameter set to false corresponds to the first TTI length and the short processing time parameter set to true corresponds to the second TTI length, and wherein determining the delay for the PCell interruption comprises determining that the PCell interruption does not occur before a subframe n+5 if the activation command or the deactivation command is transmitted on the PDSCH with the short TTI parameter not configured and the short processing time parameter set to false.

Example 10A includes the method of example 9A, further comprising determining that the PCell interruption does not occur after a subframe n+9 when the PCell uses evolved universal terrestrial radio access (E-UTRA) frequency-division duplexing (FDD).

Example 11A includes the method of example 9A, further comprising determining that the PCell interruption does not occur after a subframe n+11 when the PCell uses evolved universal terrestrial radio access (E-UTRA) time-division duplexing (TDD).

Example 12A includes the method of example 9A, further comprising determining that the PCell interruption does not occur before a subframe n+4 if the activation command or the deactivation command is transmitted on the PDSCH with the short TTI parameter not configured and the short processing time parameter set to true.

Example 13A includes the method of example 12A, further comprising determining that the PCell interruption does not occur before a subframe n+3 if the activation command or the deactivation command is transmitted on the PDSCH with a TTI corresponding to a time duration of one slot.

Example 14A includes the method of example 13A, further comprising determining that the PCell interruption does not occur before a subframe n+2 if the activation command or the deactivation command is transmitted on the PDSCH with a TTI corresponding to a time duration of one subslot.

Example 15A includes the method of example 1A, wherein the at least one parameter corresponds to a radio frequency (RF) bandwidth.

Example 16A is a method for a user equipment (UE). The method includes: receiving an activation command or a deactivation command for a secondary cell (SCell) in a subframe n; and in response to the activation command or the deactivation command, performing primary cell (PCell) interruption by suspending data communication on the PCell for a predetermined number of subframes, wherein the PCell interruption does not occur before: subframe n+5 if the activation command or the deactivation command is transmitted with a 1 millisecond (ms) TTI and a four subframe hybrid automatic repeat request (HARQ) processing time; subframe n+4 if the activation command or the deactivation command is transmitted with a 1 ms TTI and a three subframe HARQ processing time; subframe n+3 if the activation command or the deactivation command is transmitted with a TTI corresponding to a slot duration; and subframe n+2 if the activation command or the deactivation command is transmitted with a TTI corresponding to a subslot duration.

Example 17A includes the method of example 16A, wherein the activation command or the deactivation command is received in the subframe n of a physical downlink shared channel (PDSCH).

Example 18A is a method for a user equipment (UE), the method comprising: receiving an activation command or a deactivation command for a secondary cell (SCell) in a subframe n of a physical downlink shared channel (PDSCH); and performing primary cell (PCell) interruption in response to the activation command or the deactivation command, wherein the PCell interruption: does not occur before subframe n+5 if the activation command or the deactivation command is transmitted on the PDSCH with a short TTI parameter not configured and a short processing time parameter set to false; does not occur before subframe n+4 if the activation command or the deactivation command is transmitted on the PDSCH with the short TTI parameter not configured and the short processing time parameter set to true; and does not occur before subframe n=3 if the activation command or the deactivation command is transmitted on the PDSCH with TTI length corresponding to a slot duration.

Example 19A includes the method of example 18A, wherein the PCell interruption further does not occur before subframe n+2 if the activation command or the deactivation command is transmitted on the PDSCH with a TTI length corresponding to a subslot duration.

Example 20A includes the method of example 19A, wherein the PCell uses evolved universal terrestrial radio access (E-UTRA) frequency-division duplexing (FDD).

Example 21A includes the method of example 18A, wherein the PCell uses evolved universal terrestrial radio access (E-UTRA) time-division duplexing (TDD).

Example 22A is an apparatus for a user equipment (UE), the apparatus comprising: a memory interface to send or receive, to or from a memory device, data corresponding to a delay for primary cell (PCell) interruption; and a processor to: process a physical downlink shared channel (PDSCH) from a serving cell comprising an activation command or a deactivation command for a secondary cell (SCell), the activation command or the deactivation command in a first subframe of the PDSCH; in response to the activation command or the deactivation command: based on a transmission time interval (TTI) length corresponding to the PDSCH, determine the delay for PCell interruption, the delay corresponding to a selected second subframe after the first subframe, wherein a first delay for a first TTI length is longer than a second delay for a second TTI length, and wherein the second TTI length is a shortened TTI (sTTI) compared to the first TTI length; and suspend data communication on the PCell at or after the second subframe for the PCell interruption to configure at least one parameter of the UE for activation or deactivation of the SCell.

Example 23A includes the apparatus of example 22A, wherein determining the delay for the PCell interruption is further based on a hybrid automatic repeat request (HARQ) process time, wherein a shorter HARQ processing time further reduces the delay.

Example 24A includes the apparatus of example 23A, wherein the first subframe corresponding to the activation command or the deactivation command comprises a subframe n, and wherein to determine the delay for the PCell interruption comprises determine that the PCell interruption does not occur before a subframe n+5 if the activation command or the deactivation command is transmitted on the PDSCH with a 1 millisecond (ms) TTI and a four subframe HARQ processing time.

Example 25A includes the apparatus of example 24A, wherein the instructions further configure the apparatus to determine that the PCell interruption does not occur after a subframe n+9 when the PCell uses evolved universal terrestrial radio access (E-UTRA) frequency-division duplexing (FDD).

Example 26A includes the apparatus of example 24A, wherein the instructions further configure the apparatus to determine that the PCell interruption does not occur after a subframe n+11 when the PCell uses evolved universal terrestrial radio access (E-UTRA) time-division duplexing (TDD).

Example 27A includes the apparatus of example 23A, wherein the first subframe corresponding to the activation command or the deactivation command comprises a subframe n, and wherein to determine the delay for the PCell interruption comprises determine that the PCell interruption does not occur before a subframe n+4 if the activation command or the deactivation command is transmitted on the PDSCH with a 1 ms TTI and a three subframe HARQ processing time.

Example 28A includes the apparatus of example 22A, wherein the first subframe corresponding to the activation command or the deactivation command comprises a subframe n, and wherein to determine the delay for the PCell interruption comprises determine that the PCell interruption does not occur before a subframe n+3 if the activation command or the deactivation command is transmitted on the PDSCH with a TTI corresponding to one slot.

Example 29A includes the apparatus of example 22A, wherein the first subframe corresponding to the activation command or the deactivation command comprises a subframe n, and wherein to determine the delay for the PCell interruption comprises determine that the PCell interruption does not occur before a subframe n+2 if the activation command or the deactivation command is transmitted on the PDSCH with a TTI corresponding to a subslot.

Example 30A includes the apparatus of example 22A, wherein the first subframe corresponding to the activation command or the deactivation command comprises a subframe n, wherein a short TTI parameter that is configured indicates that the activation command or the deactivation command is transmitted on the PDSCH with the sTTI, wherein a short processing time parameter set to false corresponds to the first TTI length and the short processing time parameter set to true corresponds to the second TTI length, and wherein to determine the delay for the PCell interruption comprises to determine that the PCell interruption does not occur before a subframe n+5 if the activation command or the deactivation command is transmitted on the PDSCH with the short TTI parameter not configured and the short processing time parameter set to false.

Example 31A includes the apparatus of example 30A, wherein the instructions further configure the apparatus to determine that the PCell interruption does not occur after a subframe n+9 when the PCell uses evolved universal terrestrial radio access (E-UTRA) frequency-division duplexing (FDD).

Example 32A includes the apparatus of example 30A, wherein the instructions further configure the apparatus to determine that the PCell interruption does not occur after a subframe n+11 when the PCell uses evolved universal terrestrial radio access (E-UTRA) time-division duplexing (TDD).

Example 33A includes the apparatus of example 30A, wherein the instructions further configure the apparatus to determine that the PCell interruption does not occur before a subframe n+4 if the activation command or the deactivation command is transmitted on the PDSCH with the short TTI parameter not configured and the short processing time parameter set to true.

Example 34A includes the apparatus of example 33A, wherein the instructions further configure the apparatus to determine that the PCell interruption does not occur before a subframe n+3 if the activation command or the deactivation command is transmitted on the PDSCH with a TTI corresponding to a time duration of one slot.

Example 35A includes the apparatus of example 34A, wherein the instructions further configure the apparatus to determine that the PCell interruption does not occur before a subframe n+2 if the activation command or the deactivation command is transmitted on the PDSCH with a TTI corresponding to a time duration of one subslot.

Example 36A includes the apparatus of example 22A, wherein the at least one parameter corresponds to a radio frequency (RF) bandwidth.

Example 37A is a non-transitory computer-readable storage medium, the computer-readable storage medium including instructions that when executed by a processor, cause the processor to: process a physical downlink shared channel (PDSCH) from a serving cell comprising an activation command or a deactivation command for a secondary cell (SCell), the activation command or the deactivation command in a first subframe of the PDSCH; in response to the activation command or the deactivation command: based on a transmission time interval (TTI) length corresponding to the PDSCH, determine a delay for primary cell (PCell) interruption, the delay corresponding to a selected second subframe after the first subframe, wherein a first delay for a first TTI length is longer than a second delay for a second TTI length, and wherein the second TTI length is a shortened TTI (sTTI) compared to the first TTI length; and suspend data communication on the PCell at or after the second subframe for the PCell interruption to configure at least one parameter of the UE for activation or deactivation of the SCell.

Example 38A includes the computer-readable storage medium of example 37A, wherein to determine the delay for the PCell interruption is further based on a hybrid automatic repeat request (HARQ) process time, wherein a shorter HARQ processing time further reduces the delay.

Example 39A includes the computer-readable storage medium of example 38, wherein the first subframe corresponding to the activation command or the deactivation command comprises a subframe n, and wherein tp determine the delay for the PCell interruption comprises to determine that the PCell interruption does not occur before a subframe n+5 if the activation command or the deactivation command is transmitted on the PDSCH with a 1 millisecond (ms) TTI and a four subframe HARQ processing time.

Example 40A includes the computer-readable storage medium of example 39A, wherein the instructions further configure the computer to determine that the PCell interruption does not occur after a subframe n+9 when the PCell uses evolved universal terrestrial radio access (E-UTRA) frequency-division duplexing (FDD).

Example 41A includes the computer-readable storage medium of example 39A, wherein the instructions further configure the computer to determine that the PCell interruption does not occur after a subframe n+11 when the PCell uses evolved universal terrestrial radio access (E-UTRA) time-division duplexing (TDD).

Example 42A includes the computer-readable storage medium of example 38A, wherein the first subframe corresponding to the activation command or the deactivation command comprises a subframe n, and wherein determine the delay for the PCell interruption comprises determining that the PCell interruption does not occur before a subframe n+4 if the activation command or the deactivation command is transmitted on the PDSCH with a 1 ms TTI and a three subframe HARQ processing time.

Example 43A includes the computer-readable storage medium of example 37A, wherein the first subframe corresponding to the activation command or the deactivation command comprises a subframe n, and wherein determine the delay for the PCell interruption comprises determining that the PCell interruption does not occur before a subframe n+3 if the activation command or the deactivation command is transmitted on the PDSCH with a TTI corresponding to one slot.

Example 44A includes the computer-readable storage medium of example 37A, wherein the first subframe corresponding to the activation command or the deactivation command comprises a subframe n, and wherein determine the delay for the PCell interruption comprises determining that the PCell interruption does not occur before a subframe n+2 if the activation command or the deactivation command is transmitted on the PDSCH with a TTI corresponding to a subslot.

Example 45A includes the computer-readable storage medium of example 37A, wherein the first subframe corresponding to the activation command or the deactivation command comprises a subframe n, wherein a short TTI parameter that is configured indicates that the activation command or the deactivation command is transmitted on the PDSCH with the sTTI, wherein a short processing time parameter set to false corresponds to the first TTI length and the short processing time parameter set to true corresponds to the second TTI length, and wherein determining the delay for the PCell interruption comprises determining that the PCell interruption does not occur before a subframe n+5 if the activation command or the deactivation command is transmitted on the PDSCH with the short TTI parameter not configured and the short processing time parameter set to false.

Example 46A includes the computer-readable storage medium of example 45A, wherein the instructions further configure the computer to determine that the PCell interruption does not occur after a subframe n+9 when the PCell uses evolved universal terrestrial radio access (E-UTRA) frequency-division duplexing (FDD).

Example 47A includes the computer-readable storage medium of example 45A, wherein the instructions further configure the computer to determine that the PCell interruption does not occur after a subframe n+11 when the PCell uses evolved universal terrestrial radio access (E-UTRA) time-division duplexing (TDD).

Example 48A includes the computer-readable storage medium of example 45A, wherein the instructions further configure the computer to determine that the PCell interruption does not occur before a subframe n+4 if the activation command or the deactivation command is transmitted on the PDSCH with the short TTI parameter not configured and the short processing time parameter set to true.

Example 49A includes the computer-readable storage medium of example 48A, wherein the instructions further configure the computer to determine that the PCell interruption does not occur before a subframe n+3 if the activation command or the deactivation command is transmitted on the PDSCH with a TTI corresponding to a time duration of one slot.

Example 50A includes the computer-readable storage medium of example 49A, wherein the instructions further configure the computer to determine that the PCell interruption does not occur before a subframe n+2 if the activation command or the deactivation command is transmitted on the PDSCH with a TTI corresponding to a time duration of one subslot.

Example 51A includes the computer-readable storage medium of example 37A, wherein the at least one parameter corresponds to a radio frequency (RF) bandwidth.

Example 52A is an apparatus for a user equipment (UE), the apparatus comprising: a processor; and a memory storing instructions that, when executed by the processor, configure the apparatus to: receive an activation command or a deactivation command for a secondary cell (SCell) in a subframe n; and in response to the activation command or the deactivation command, perform primary cell (PCell) interruption by suspending data communication on the PCell for a predetermined number of subframes, wherein the PCell interruption does not occur before: subframe n+5 if the activation command or the deactivation command is transmitted with a 1 millisecond (ms) TTI and a four subframe hybrid automatic repeat request (HARQ) process time; subframe n+4 if the activation command or the deactivation command is transmitted with a 1 ms TTI and a three subframe HARQ process time; subframe n+3 if the activation command or the deactivation command is transmitted with a TTI corresponding to a slot duration; and subframe n+2 if the activation command or the deactivation command is transmitted with a TTI corresponding to a subslot duration.

Example 53A includes the apparatus of example 52A, wherein the activation command or the deactivation command is received in the subframe n of a physical downlink shared channel (PDSCH).

Example 54A is a non-transitory computer-readable storage medium, the computer-readable storage medium including instructions that when executed by a computer, cause the computer to: receive an activation command or a deactivation command for a secondary cell (SCell) in a subframe n; and in response to the activation command or the deactivation command, perform primary cell (PCell) interruption by suspending data communication on the PCell for a predetermined number of subframes, wherein the PCell interruption does not occur before: subframe n+5 if the activation command or the deactivation command is transmitted with a 1 millisecond (ms) TTI and a four subframe hybrid automatic repeat request (HARQ) process time; subframe n+4 if the activation command or the deactivation command is transmitted with a 1 ms TTI and a three subframe HARQ process time; subframe n+3 if the activation command or the deactivation command is transmitted with a TTI corresponding to a slot duration; and subframe n+2 if the activation command or the deactivation command is transmitted with a TTI corresponding to a subslot duration.

Example 55A is a computer-readable storage medium of example 54A, wherein the activation command or the deactivation command is received in the subframe n of a physical downlink shared channel (PDSCH).

Example 56A is an apparatus for a user equipment (UE), the apparatus comprising: a processor; and a memory storing instructions that, when executed by the processor, configure the apparatus to: receive an activation command or a deactivation command for a secondary cell (SCell) in a subframe n of a physical downlink shared channel (PDSCH); and perform primary cell (PCell) interruption in response to the activation command or the deactivation command, wherein the PCell interruption: does not occur before subframe n+5 if the activation command or the deactivation command is transmitted on the PDSCH with a short TTI parameter not configured and a short processing time parameter set to false; does not occur before subframe n+4 if the activation command or the deactivation command is transmitted on the PDSCH with the short TTI parameter not configured and the short processing time parameter set to true; and does not occur before subframe n=3 if the activation command or the deactivation command is transmitted on the PDSCH with TTI length corresponding to a slot duration.

Example 57A includes the apparatus of example 56A, wherein the PCell interruption further does not occur before subframe n+2 if the activation command or the deactivation command is transmitted on the PDSCH with a TTI length corresponding to a subslot duration.

Example 58A includes the apparatus of example 57A, wherein the PCell uses evolved universal terrestrial radio access (E-UTRA) frequency-division duplexing (FDD).

Example 59A includes the apparatus of example 56A, wherein the PCell uses evolved universal terrestrial radio access (E-UTRA) time-division duplexing (TDD).

Example 60A is a non-transitory computer-readable storage medium, the computer-readable storage medium including instructions that when executed by a computer, cause the computer to: receive an activation command or a deactivation command for a secondary cell (SCell) in a subframe n of a physical downlink shared channel (PDSCH); and perform primary cell (PCell) interruption in response to the activation command or the deactivation command, wherein the PCell interruption: does not occur before subframe n+5 if the activation command or the deactivation command is transmitted on the PDSCH with a short TTI parameter not configured and a short processing time parameter set to false; does not occur before subframe n+4 if the activation command or the deactivation command is transmitted on the PDSCH with the short TTI parameter not configured and the short processing time parameter set to true; and does not occur before subframe n=3 if the activation command or the deactivation command is transmitted on the PDSCH with TTI length corresponding to a slot duration.

Example 61A includes the computer-readable storage medium of example 60A, wherein the PCell interruption further does not occur before subframe n+2 if the activation command or the deactivation command is transmitted on the PDSCH with a TTI length corresponding to a subslot duration.

Example 62A includes the computer-readable storage medium of example 61A, wherein the PCell uses evolved universal terrestrial radio access (E-UTRA) frequency-division duplexing (FDD).

Example 63A includes the computer-readable storage medium of example 60A, wherein the PCell uses evolved universal terrestrial radio access (E-UTRA) time-division duplexing (TDD).

Example 64A is a non-transitory computer-readable storage medium including instructions that, when processed by a computer, configure the computer to perform the method of any of example 1A to example 21A.

Example 65A is a non-transitory computer-readable storage medium including instructions that, when processed by a computer, configure the computer to perform the method of any of example 1A to example 21A.

Example 1B may include the PCell interruption due to SCell activation and deactivation may not occur before: subframe n+5 if the deactivation command is transmitted on the PDSCH with 1 ms TTI and 4 subframe HARQ processing time; subframe n+4 if the deactivation command is transmitted on the PDSCH with 1 ms TTI and 3 subframe HARQ processing time; subframe n+3 if the deactivation command is transmitted on the PDSCH with 1 slot TTI; and subframe n+2 if the deactivation command is transmitted on the PDSCH with sub slot TTI.

Example 2B may include the interruption location for SCell activation and deactivation for Rel-15 UE can be earlier than that for LTE UE when shorten TTI is applied.

Example 3B may include when MAC CE is transmitted with shorten TTI with reduced processing, Rel-15 UE can start the action of the SCell activation and deactivation earlier than Rel-14 UE.

Example 4B may include an apparatus comprising means to perform one or more elements of a method described in or related to any of examples 1B-3B, or any other method or process described herein.

Example 5B may include one or more non-transitory computer-readable media comprising instructions to cause an electronic device, upon execution of the instructions by one or more processors of the electronic device, to perform one or more elements of a method described in or related to any of examples 1B-3B, or any other method or process described herein.

Example 6B may include an apparatus comprising logic, modules, or circuitry to perform one or more elements of a method described in or related to any of examples 1B-3B, or any other method or process described herein.

Example 7B may include a method, technique, or process as described in or related to any of examples 1B-3B, or portions or parts thereof.

Example 8B may include an apparatus comprising: one or more processors and one or more computer readable media comprising instructions that, when executed by the one or more processors, cause the one or more processors to perform the method, techniques, or process as described in or related to any of examples 1B-3B, or portions thereof.

Example 9B may include a signal as described in or related to any of examples 1B-3B, or portions or parts thereof.

Example 10B may include a signal in a wireless network as shown and described herein.

Example 11B may include a method of communicating in a wireless network as shown and described herein.

Example 12B may include a system for providing wireless communication as shown and described herein.

Example 13B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus for a user equipment (UE), the apparatus comprising:

a memory interface to send or receive, to or from a memory device, data corresponding to a delay for primary cell (PCell) interruption; and a processor coupled to the memory interface to:
decode a physical downlink shared channel (PDSCH) from a serving cell comprising an activation command or a deactivation command for a secondary cell (SCell), the activation command or the deactivation command in a first subframe of the PDSCH;
in response to the activation command or the deactivation command:
based on a transmission time interval (TTI) corresponding to the PDSCH, determine the delay for PCell interruption, the delay corresponding to a selected second subframe after the first subframe; and
suspend data communication on the PCell at or after the second subframe for the PCell interruption, wherein:
the first subframe corresponding to the activation command or the deactivation command comprises a subframe n;
a configured short TTI parameter is to indicate that the activation command or the deactivation command is transmitted on the PDSCH with a shortened TTI (sTTI), and a short processing time parameter if set to true is to correspond to the sTTI; and
to determine the delay for the PCell interruption comprises to determine that the PCell interruption does not occur before a subframe n+5 if the activation command or the deactivation command is transmitted on the PDSCH with the short TTI parameter not configured and the short processing time parameter set to false.

2. The apparatus of claim 1, wherein the processor is further to determine that the PCell interruption does not occur after a subframe n+9 when the PCell uses evolved universal terrestrial radio access (E-UTRA) frequency-division duplexing (FDD).

3. The apparatus of claim 1, wherein the processor is further to determine that the PCell interruption does not occur after a subframe n+11 when the PCell uses evolved universal terrestrial radio access (E-UTRA) time-division duplexing (TDD).

4. The apparatus of claim 1, wherein the processor is further to determine that the PCell interruption does not occur before a subframe n+4 if the activation command or the deactivation command is transmitted on the PDSCH with the short TTI parameter not configured and the short processing time parameter set to true.

5. The apparatus of claim 4, wherein the processor is further to determine that the PCell interruption does not occur before a subframe n+3 if the activation command or the deactivation command is transmitted on the PDSCH with a TTI corresponding to a time duration of one slot.

6. The apparatus of claim 1, wherein the processor is further to determine that the PCell interruption does not occur before a subframe n+2 if the activation command or the deactivation command is transmitted on the PDSCH with a TTI corresponding to a time duration of one subslot.

7. A non-transitory computer-readable storage medium, the computer-readable storage medium including instructions that when executed by a computer, cause the computer to:

receive an activation command or a deactivation command for a secondary cell (SCell) in a subframe n of a physical downlink shared channel (PDSCH); and perform primary cell (PCell) interruption in response to the activation command or the deactivation command, wherein the PCell interruption:

does not occur before subframe n+5 if the activation command or the deactivation command is transmitted on the PDSCH with a short TTI parameter not configured and a short processing time parameter set to false;

does not occur before subframe n+4 if the activation command or the deactivation command is transmitted on the PDSCH with the short TTI parameter not configured and the short processing time parameter set to true; and does not occur before subframe n=3 if the activation command or the deactivation command is transmitted on the PDSCH with TTI length corresponding to a slot duration.

8. The computer-readable storage medium of claim 7, wherein the PCell interruption further does not occur before subframe n+2 if the activation command or the deactivation command is transmitted on the PDSCH with a TTI length corresponding to a subslot duration.

9. The computer-readable storage medium of claim 8, wherein the PCell uses evolved universal terrestrial radio access (E-UTRA) frequency-division duplexing (FDD).

10. The computer-readable storage medium of claim 7, wherein the PCell uses evolved universal terrestrial radio access (E-UTRA) time.

* * * * *